Oct. 13, 1931.    W. L. SAUNDERS    1,827,489

VARIABLE SPEED TRANSMISSION

Filed Aug. 15, 1930

W. L. Saunders
INVENTOR

BY *Munn & Co.*

ATTORNEYS

Patented Oct. 13, 1931

1,827,489

UNITED STATES PATENT OFFICE

WILLIAM L. SAUNDERS, OF CHICAGO, ILLINOIS

VARIABLE SPEED TRANSMISSION

Application filed August 15, 1930. Serial No. 475,499.

My invention relates to improvements in variable speed transmissions, and it consists in the combinations, constructions, and arrangements herein described and claimed.

In the ordinary variable speed transmission such as that used in connection with an automobile and similar power propelled vehicles, it is necessary to manually shift gears when going from one speed to another as, for instance, from first to second or second to high. This is sometimes difficult to do especially if the rate at which the vehicle is going does not correspond with the rate at which the gears of the transmission are turning and this results many times in stripping the gears.

An object of my invention is to provide a device of the hydraulic type in which means are provided whereby a drive shaft may be operatively connected with a driven shaft regardless of the relative speed of one or both of the shafts.

A further object is to provide a transmission which is more compact, has fewer parts, and is less expensive to build than the ordinary transmission.

A further object is to provide a transmission mechanism by the use of which various speeds may be obtained and in which the necessity for shifting gears has been entirely eliminated.

A further object is to provide a transmission which will tend to simplify the operation of motor vehicles such as automobiles, trucks and the like.

A further object is to provide a transmission in which means is provided whereby a drive shaft may be rigidly connected with a driven shaft for rotating the latter in either direction.

Other objects and advantages will appear in the following specification, and the novel features of the invention will be particularly pointed out in the appended claims.

Figure 1:
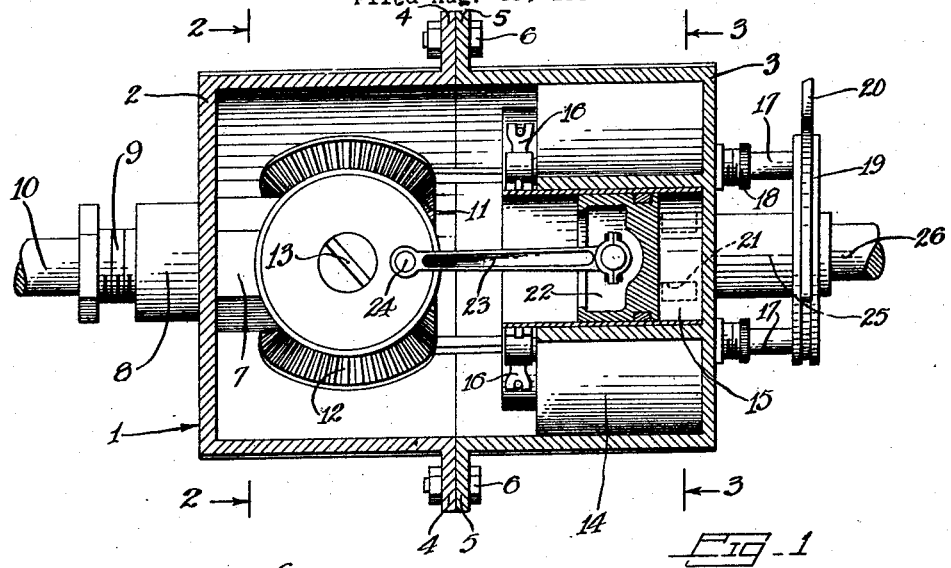
Figures 2, 3:
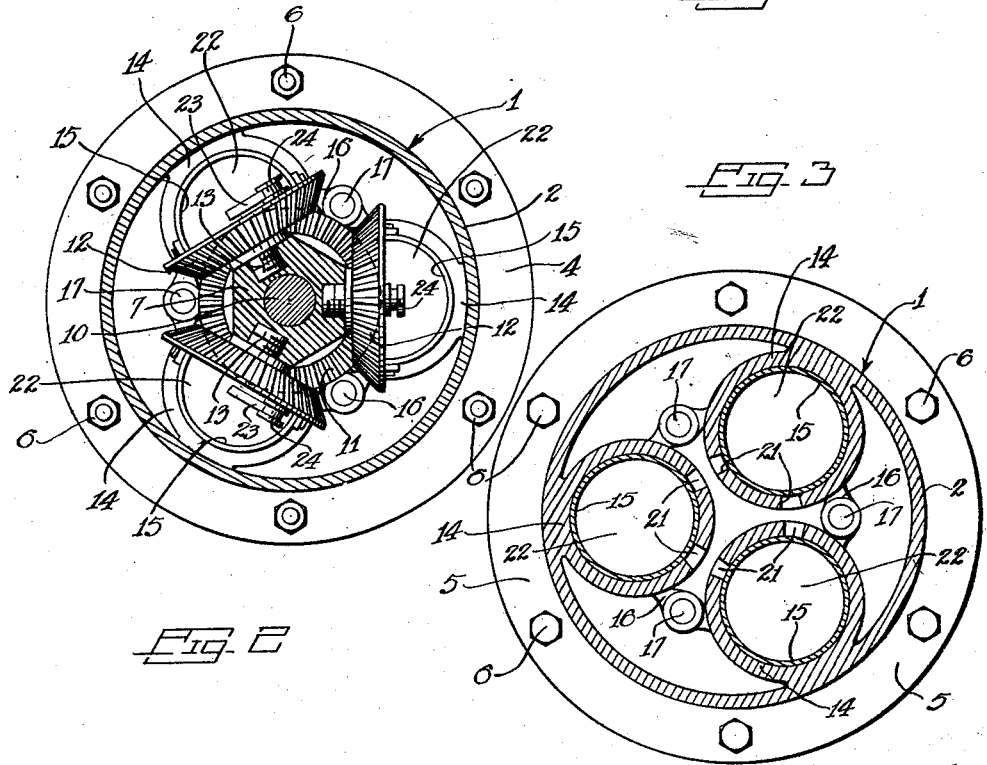

My invention is illustrated in the accompanying drawings, forming part of this application, in which Figure 1 is a longitudinal sectional view of the mechanism embodying my invention, Figure 2 is a sectional view taken along the line 2—2 of Figure 1, and Figure 3 is a sectional view taken along the line 3—3 of Figure 1.

In carrying out my invention, I make use of a transmission casing 1 comprising sections 2 and 3 having flange portions 4 and 5, respectively. The faces of the flanges may be finished for providing a tight connection and secured together by means of bolts 6. The section 2 is provided with an internal boss 7 and an external boss 8. The latter is preferably provided with a packing nut 9. The bosses 7 and 8 are positioned in alignment and are provided with a common opening for receiving a drive shaft 10. One end of the drive shaft projects through the internal boss 7 and is provided with a beveled gear 11 which is disposed in mesh with a plurality of beveled gears 12. The latter are mounted upon alternate faces of the boss as will be seen by referring to Figure 2. The gears 12 are preferably mounted upon bearing portions integral with screws 13. The ends of the latter may be threaded and disposed within threaded openings in the boss as indicated in Figure 2.

The section 3 is provided with a plurality of integral cylinders 14. The cylinders are preferably cast with the section as a unit. The interior of the cylinders is of course ground. A movable sleeve 15 is placed within each of the cylinders. The sleeves are operatively connected together by means of yokes 16. The yokes are mounted upon rods 17 which pass through openings in the end of the section 3. Packing nuts 18 surround the rods for sealing purposes as shown in Figure 1. The outer ends of the rods 17 are rigidly connected with a grooved member 19 which in turn is operatively connected with a shift lever 20. The latter is preferably of a bifurcated construction and is of course operatively connected within the groove in the member 19.

Each of the cylinders is provided with a pair of ports 21. The ports place the cylinders in communication with the interior of the casing 1. Each cylinder contains a piston 22. The pistons are slidably disposed within the sleeves 15. A connecting rod 23 is associated with each of the pistons. Thus it will be seen that the pistons are operatively connected with the gears 12. The rods may be connected with the gears through the medium of connecting elements 24. The connecting elements are preferably positioned at 120° from one another. The pistons will be moved in reciprocatory paths through the rotation of the shaft 10. Normally the sleeves 15 are positioned for uncovering the openings 21. The member 19 is slidably mounted upon a boss 25 associated with the section 3. A driven shaft 26 is rigidly connected with the boss 25. The sleeves may be shifted through the medium of the shift lever 20. The sleeves may be shifted various distances for uncovering any desired amount of the ports 21.

The gears 12 and their associated pistons will of course be active when the motor is running. The casing 1 is filled with any suitable liquid, preferably an oil.

When the sleeves 15 have been shifted for uncovering the ports 21, the oil or other liquid within the casing is undergoing a churning action during the operation of the pistons. In other words, the liquid is shifted within the casing and through the ports 21. When it is desired to rigidly connect the drive shaft 10 with the driven shaft 26, the sleeves are moved for covering the ports 21. At this time the two shafts will be rigidly locked together. When the two shafts are rigidly connected, the shaft 26 will of course rotate at the same speed that the drive shaft is being rotated. The shaft 26 may, however, be rotated at various rates of speed with respect to the drive shaft while the latter is being rotated at a given and constant speed. This may be accomplished through the shifting of the sleeves 15 for uncovering various amounts of the ports 21. The speed of the shaft 26 will tend to assume the speed of the drive shaft 10 in proportion to the constriction of the ports 21. Similarly the driven shaft will assume a slower speed of rotation in proportion to the increased uncovering of the ports 21.

It will now be seen that I have provided a transmission mechanism in which I have eliminated the necessity for the usual shifting of gears for obtaining various speeds. Further than this, I have entirely eliminated the usual clutch construction. The invention embodies a relatively small number of moving parts and the arrangement is a compact one and easy to assemble. It will be noted in referring to Figure 1 that the pistons 22 substantially reach the ports 21 when they are moved their maximum distance toward the closed end of the section 3. The sleeves 15 may be shifted for totally uncovering the ports 21. At this time the ends of the sleeves nearest the outer end of the section 3 will be substantially aligned with the outer ends of the pistons when positioned as shown in Figure 1. Figure 1 exposes a single piston to view. As stated above, the pistons are not aligned.

I claim:

1. The combination with a driving shaft and a driven shaft, of a variable speed mechanism comprising a casing adapted for containing a fluid and rigidly connected with the driven shaft, said driving shaft extending within the casing and rotatable with respect thereto, a driving gear fixedly mounted on the driving shaft, driven gears rotatably mounted within the casing and in mesh with said driving gear, said casing being provided with cylindrical chambers therein, the walls of said chambers having openings therein for providing communication therebetween, cylindrical sleeves disposed within the cylindrical chambers and slidable with respect thereto, pistons slidably disposed within said sleeves, piston rods connecting said pistons with the driven gears, and means whereby said cylinder sleeves may be moved for varying the openings in said cylinder walls.

2. The combination with a driving shaft and a driven shaft, of a variable speed mechanism comprising a casing adapted for containing a fluid and rigidly connected with the driven shaft, said driving shaft extending within the casing and rotatable with respect thereto, a driving gear fixedly mounted on the driving shaft, driven gears rotatably mounted within the casing and in mesh with said driving gear, said casing being provided with cylindrical chambers therein, the walls of said chambers having openings therein for providing communication therebetween, cylindrical sleeves disposed within the cylindrical chambers and slidable with respect thereto, pistons slidably disposed within said sleeves, piston rods connecting said pistons with the driven gears, yokes disposed in said casing and operatively connected with said cylindrical sleeves, and means disposed on the exterior of said casing and operatively connected with said yokes whereby the cylindrical sleeves may be moved for varying the openings in said cylindrical walls.

3. The combination with a driving shaft and a driven shaft, of a variable speed mechanism comprising a casing adapted for containing a fluid and rigidly connected with the driven shaft, said driving shaft extending within the casing and rotatable with respect thereto, a driving gear fixedly mounted on the driving shaft, driven gears rotatably mounted within the casing and in mesh with said driving gear, said casing being provided with cylindrical chambers therein, the walls of said chambers having openings therein for providing communication therebetween, cylindrical sleeves disposed within the cylindrical chambers and slidable with respect thereto, pistons slidably disposed within said sleeves, piston rods connecting said pistons with the driven gears, yokes disposed in said casing and operatively connected with said cylindrical sleeves, rod members connected with said yokes and extending through the casing, and means for actuating said rod members whereby said cylindrical sleeves may be moved for varying the openings in said cylindrical walls.

WILLIAM L. SAUNDERS.